United States Patent
Lennen et al.

(10) Patent No.: US 6,252,546 B1
(45) Date of Patent: Jun. 26, 2001

(54) METHOD AND APPARATUS FOR PROCESSING MULTIPATH REFLECTION EFFECTS IN TIMING SYSTEMS

(75) Inventors: Gary R. Lennen; Scott R. Smith, both of Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/692,006

(22) Filed: Oct. 19, 2000

Related U.S. Application Data

(63) Continuation of application No. 09/275,482, filed on Mar. 24, 1999, now Pat. No. 6,154,173.

(51) Int. Cl.[7] .......................... H01Q 21/06; H01Q 21/24; H04B 7/10
(52) U.S. Cl. .......................... 342/363; 342/365
(58) Field of Search .................... 342/361, 362, 342/363, 364, 365, 366

(56) References Cited

U.S. PATENT DOCUMENTS 5,760,740 * 6/1998 Blodgett .............................. 342/362

* cited by examiner

Primary Examiner—Theodore M. Blum
(74) Attorney, Agent, or Firm—Cooper & Dunham LLP; William E. Pelton; Donald S. Dowden

(57) ABSTRACT

A method and apparatus for processing multipath reflection effects in timing systems is disclosed in which a determination is made of whether a received signal is a reflected signal. A detector provides from an input signal a pair of signals representative of whether the input signal contained right-hand circularly polarized and left-hand circularly polarized components. The representative signals are separately processed in synchronized logic circuits to determine relative power levels. The power levels are compared to determine the nature of the dominant polarization of the input signal.

1 Claim, 8 Drawing Sheets

ANTI-REFLECTION RECEIVER OVERVIEW

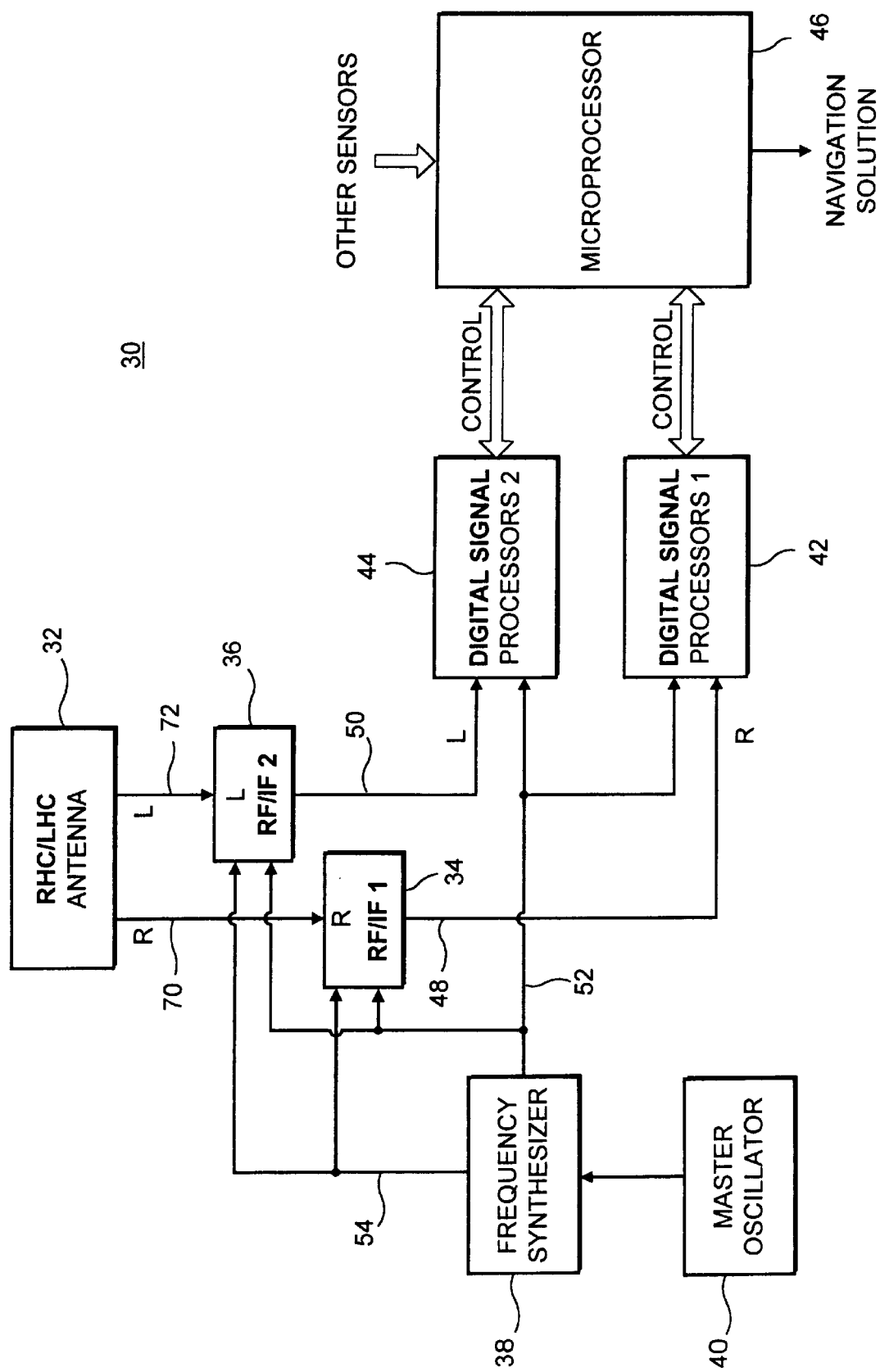
FIG. 2 – ANTI-REFLECTION RECEIVER OVERVIEW

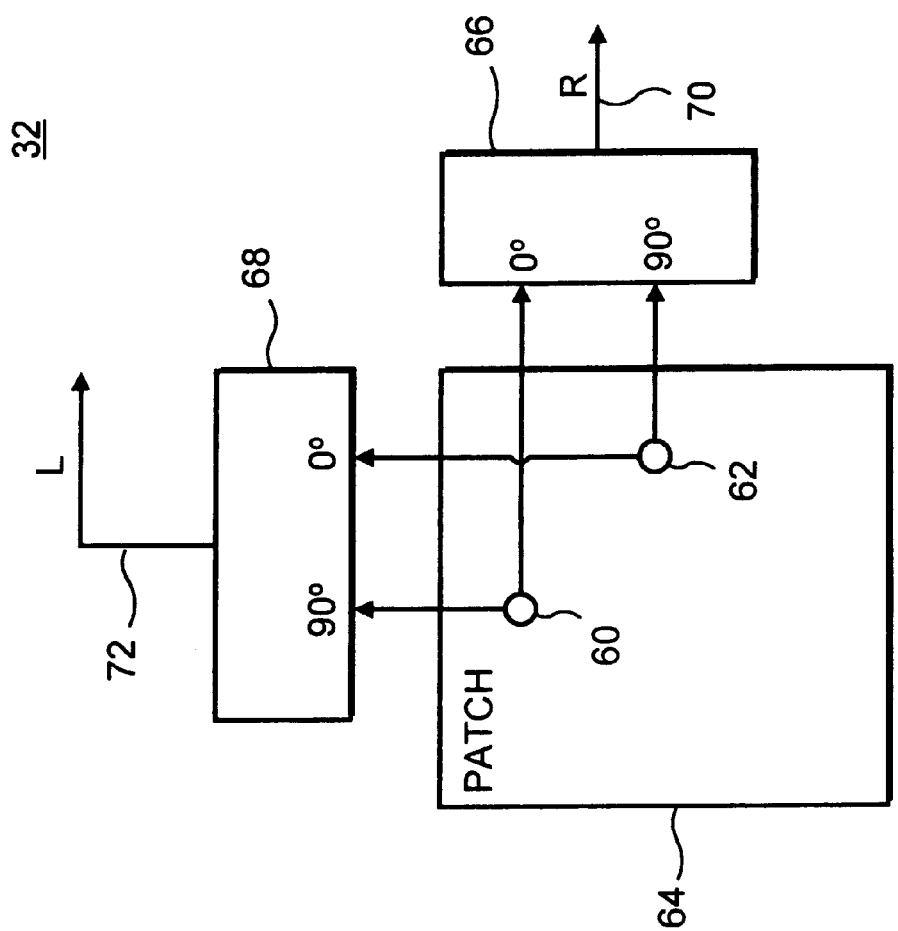
FIG. 3 - RHC/LHC ANTENNA

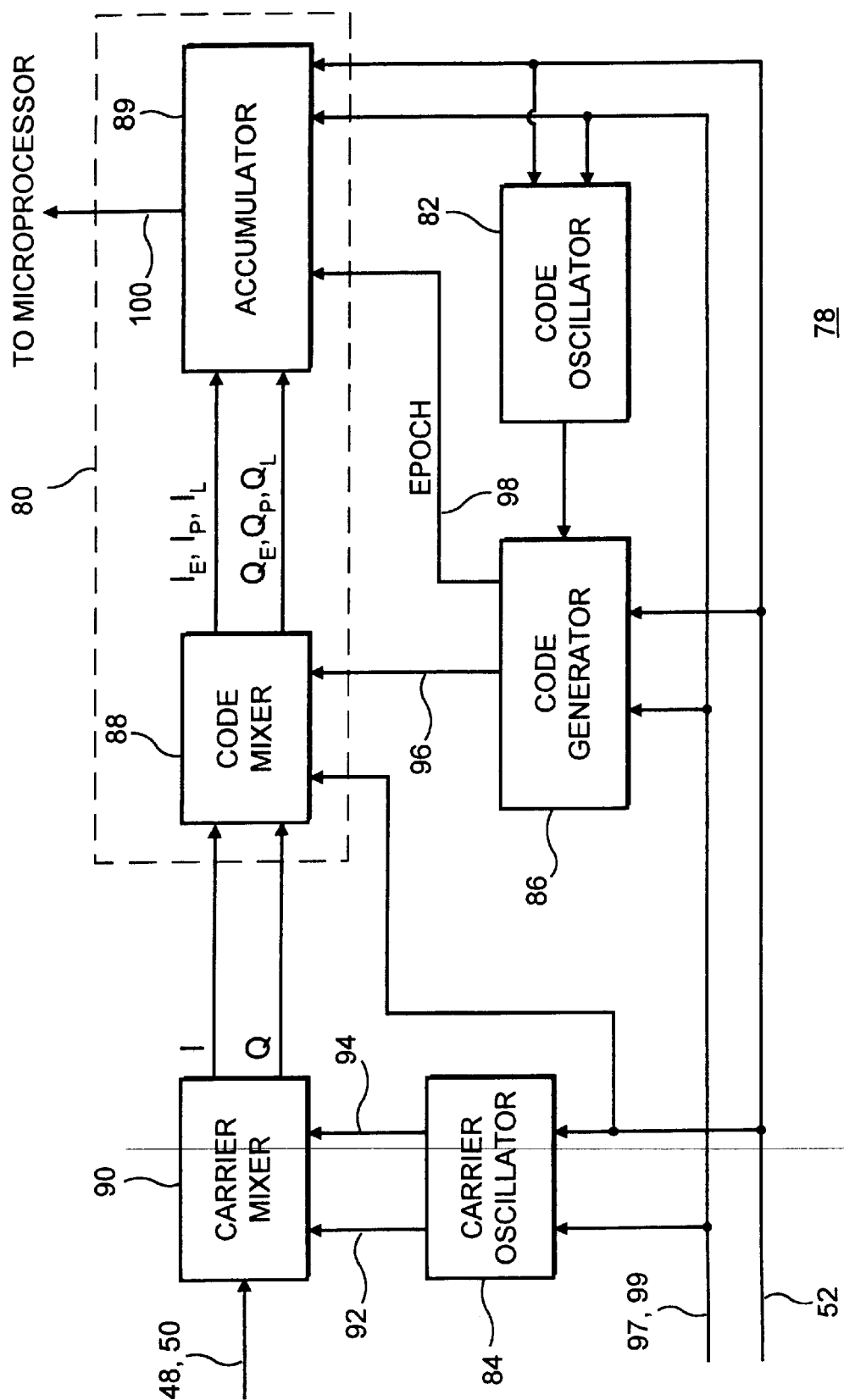
F I G. 4 - DIGITAL SIGNAL PROCESSOR

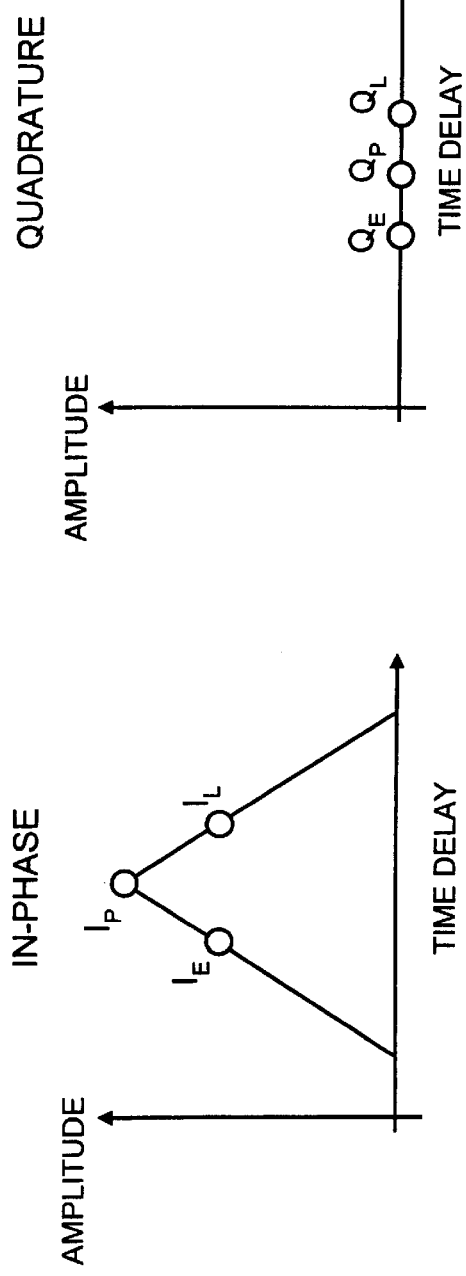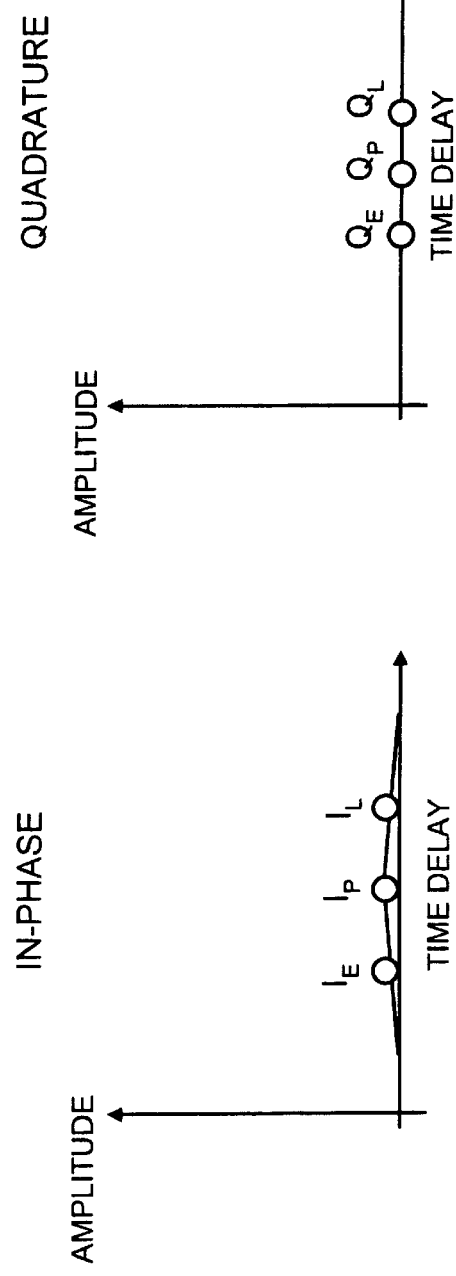

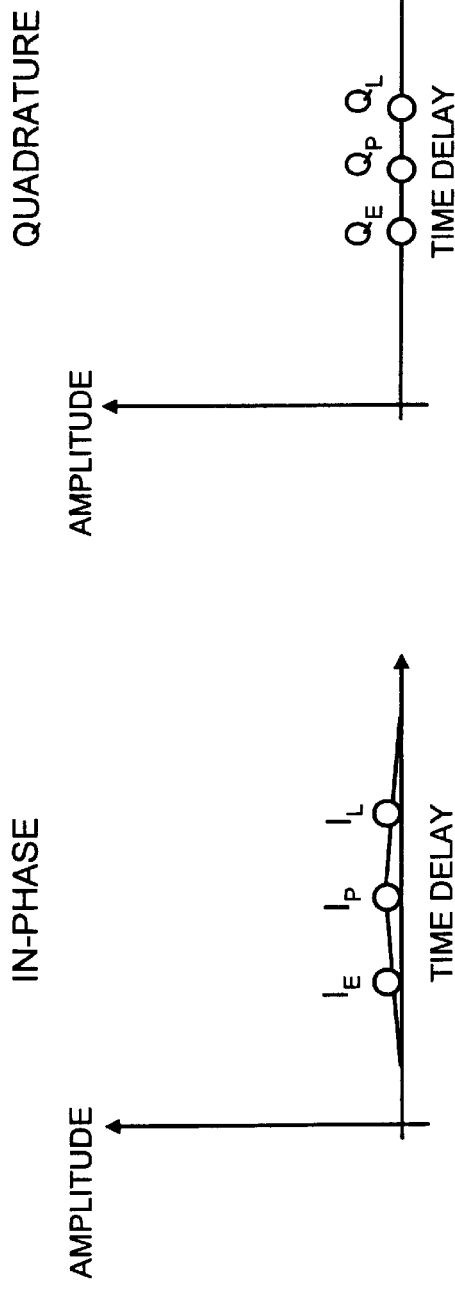
FIG. 6a - CORRELATIONS, REFLECTED SIGNAL ONLY, RH$_s$ CHANNEL PROCESSOR.
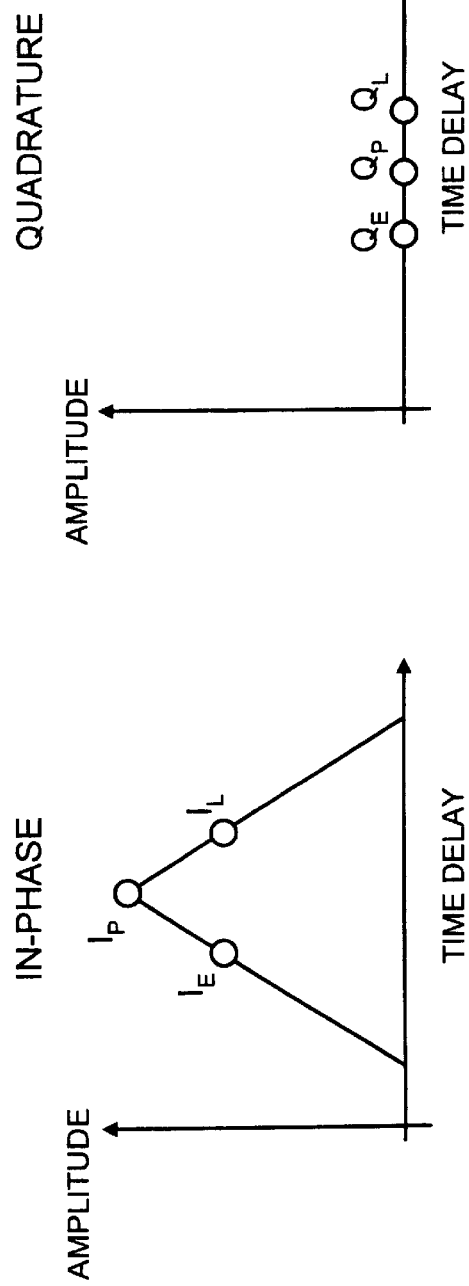
FIG. 6b - CORRELATIONS, REFLECTED SIGNAL ONLY, LH$_s$ CHANNEL PROCESSOR.

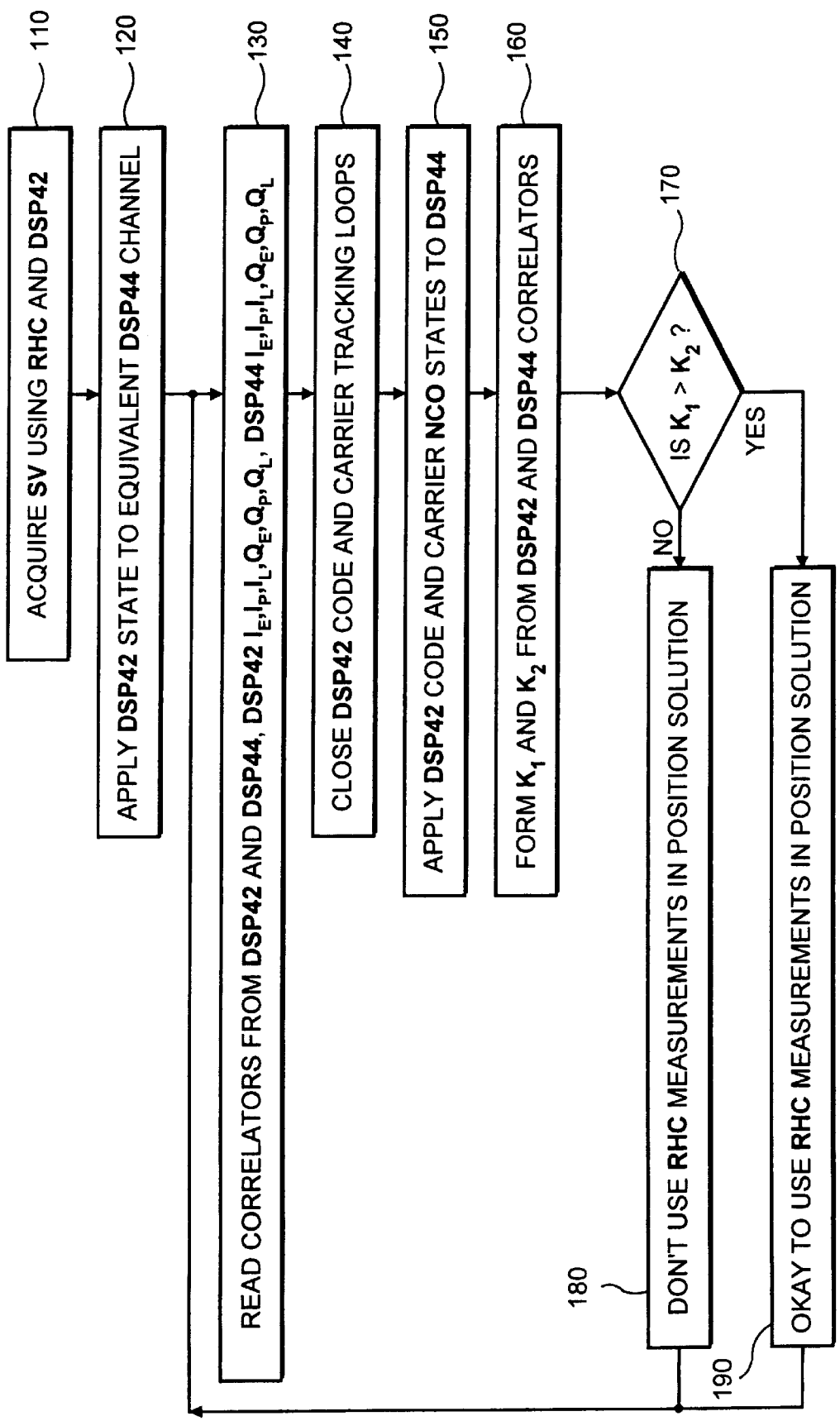
FIG. 7 – METHOD OF DETECTING/ REMOVING REFLECTION ONLY SIGNALS

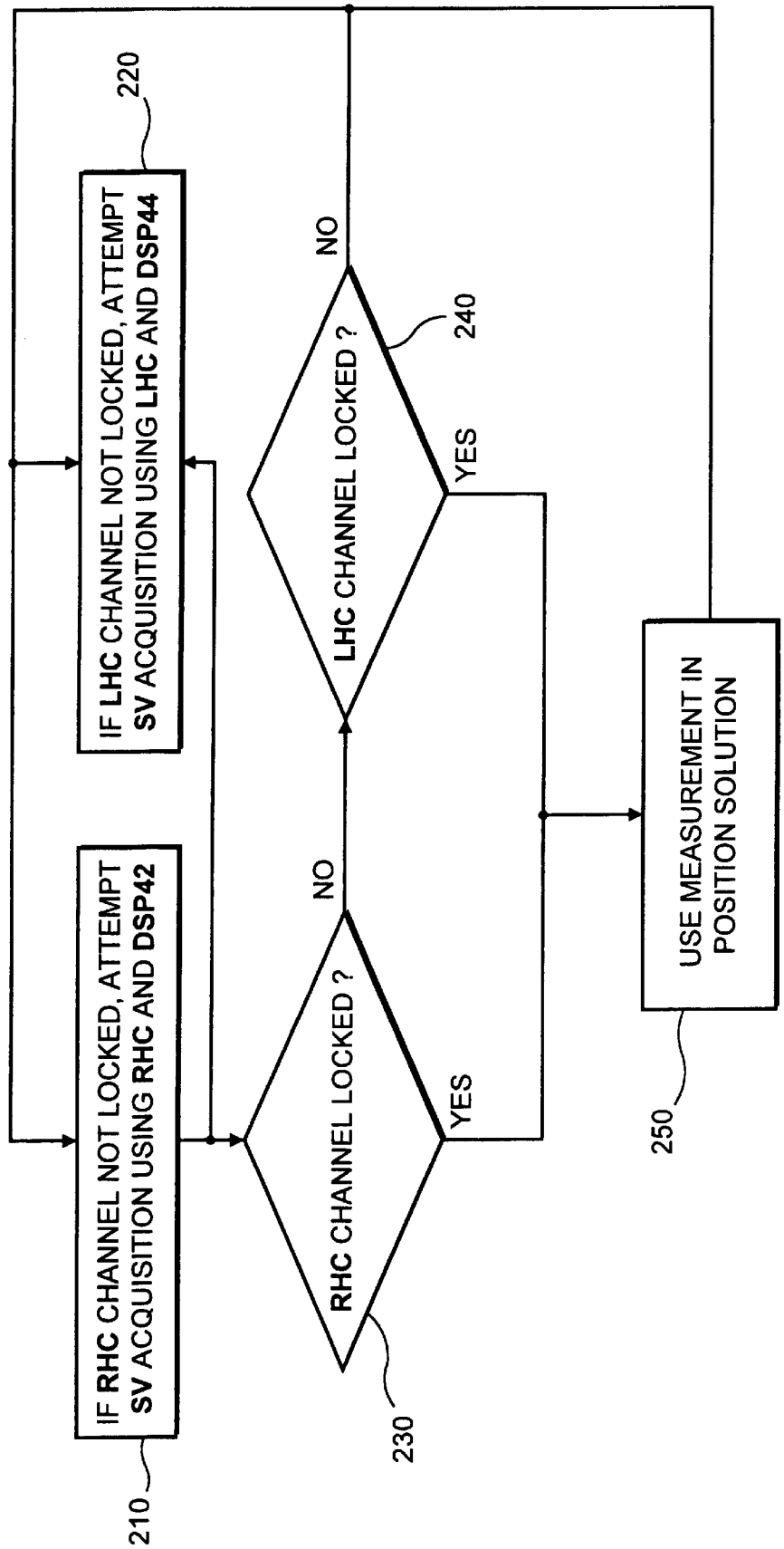
FIG. 8 - METHOD OF OPTIMALLY USING REFLECTED SIGNALS

METHOD AND APPARATUS FOR PROCESSING MULTIPATH REFLECTION EFFECTS IN TIMING SYSTEMS

This is a continuation of application Ser. No. 09/275,482 filed Mar. 24, 1999, now U.S. Pat. No. 6,154,173. Applicants claim priority of that application under 35 U.S.C. §120 and incorporate it herein by reference.

FIELD OF THE INVENTION

The present invention relates to timing systems and, in particular, to timing systems having the capability of eliminating or reducing reflection-induced errors on the accuracy of timing measurements derived from satellite or ground based radio signals.

BACKGROUND OF THE INVENTION

Systems that utilize timing measurements as a basis for determining position have many useful applications, including surveying and navigation. Examples of such systems are the United States' Global Positioning System ("GPS"), the (former) Union of Soviet Socialist Republics' Global Navigation System ("GLONASS"), and cellular phone based systems incorporating position solutions.

GPS is a positioning system comprising satellite signal transmitters that transmit information from which an observer with a suitable receiver can determine present location on or adjacent to the Earth's surface, as well as make timing measurements such as standard time-of-day or time of observation. The fully operational GPS includes up to 24 earth-orbiting satellites that move with time relative to the earth below. The GPS satellites are substantially uniformly dispersed around six approximately circular non-geosynchronous orbits, each orbit having four satellites. Each satellite is equipped with an atomic clock to provide timing information for the transmitted signals. The GLONASS system also uses 24 satellites dispersed in three orbital planes of eight satellites each. The methods for receiving and analyzing GLONASS signals are similar to the methods used for GPS signals.

Each GPS satellite transmits two carrier signals L1 and L2. The L1 signal from each satellite is modulated with two types of codes and a navigation message. The L2 signal from each satellite is modulated by only one type of code. The navigation message contains information on the ephemerides, that is the position, of all the satellites, GPS time (the standard time-of-day), the clock behavior on the satellites, and GPS status messages. The two types of codes are the C/A-code (coarse/acquisition code) and the P-code (precise code), both of which are pseudorandom noise ("PRN") codes. The C/A-code modulates the L1 signal and is the standard GPS code. It is sometimes referred to as the "civilian code" because most civilian receivers use it. The P-code modulates both the L1 and L2 signals and was designed to provide more accuracy in position determinations than can usually be obtained through use of the C/A-code. The P-code is often used by the military.

All GPS satellite transmissions are derived from the fundamental frequency of 10.23 megahertz (MHZ) and are generated onboard each satellite on the basis of timing information supplied by atomic clocks. The L1 carrier frequency is 1575.42 MHZ and may be determined by multiplying the fundamental frequency by 154. The L2 carrier frequency is 1227.60 MHZ and may be determined by multiplying the fundamental frequency by 120. The rate at which the symbols ("chipping rate") of the P-code are transmitted is the fundamental frequency of 10.23 MHZ, whereas the chipping rate of the C/A-code is 1.023 MHZ, or one-tenth of the fundamental frequency. The C/A-code defines a repeating epoch sequence of 1023 pseudorandom binary bits ("chips") which is biphase modulated onto the L1 GPS carrier signal. The corresponding sequence for the P-code consists of 235 trillion binary bits.

In order to acquire and track a particular source of positioning system information, such as a GPS satellite, a positioning receiver generates a local version of that source's code which is continuously shifted in time to match the code of the incoming signal. The receiver is said to be "code-locked" if the locally generated punctual code can maintain "alignment in time" with the received code. Correlators are used to measure the amount of alignment of the locally generated code with respect to the received code. The output of the correlators, averaged over a particular time period, is used to calculate the amount of shift anticipated to be needed for subsequent time periods. To provide an indication of which way (earlier or later) to time shift the locally generated punctual code signal, additional correlations are performed in most positioning receivers. One correlation is performed with an earlier shifted local code and another with a later shifted local code. The difference between these correlations is used to control the positioning receiver's code generator to advance or retard the code by driving the difference between the correlation amounts to zero.

Because the accumulated result for a correlator varies according to the received signal strength, the maximum correlation value can be difficult to determine. Accordingly, most positioning receivers also include additional correlators to generate accumulated results for other local signals that are shifted in time, i.e. phase shifted, by one-quarter cycle, that is 90 degrees, with respect to the corresponding in-phase signal, commonly referred to as "I" signals. These additional reference signals are called quadrature signals, and are commonly referred to as "Q" signals. Because the received signals and local signals are primarily sinusoidal, an in-phase signal will have maximum power when the power of the corresponding quadrature signal has been driven to zero. When the locally generated code and the received code are aligned in time, the information concerning the alignment as well as the navigation message can be used to obtain both the position of the source and the amount of time, known as the "travel time", that the source's signal requires to reach the positioning receiver.

Travel time is used to calculate position. Accordingly, the accuracy of the position determination depends upon using signals that arrive directly from the source. In practice, however, the receiver antenna is omnidirectional. It will often receive not only the desired direct signal but also signals from the desired source that may have been reflected from nearby objects before reaching it. Since reflected signals take a longer path to reach the antenna than the direct signals, a multipath error is introduced to the position calculations by way of the additional travel time incurred by reflected signals. Moreover, the magnitude and phase of such reflected signals with respect to the direct signal will vary from one antenna environment to another. Such variations are especially problematical when the antenna is moving.

It has been known heretofore to attempt to reduce such multipath error by averaging the collected measurements in order to subtract out multipath induced inaccuracies. This technique however has required that the antenna remain essentially stationary for a period of several minutes, a requirement that cannot be met in many applications. Other known attempts to mitigate multipath induced error have included altering the antenna gain pattern to reduce its sensitivity to low elevation or ground level reflections. Such techniques have not heretofore proved to be entirely reliable.

In general, efforts heretofore to mitigate multipath effects have centered around processing techniques for predicting and then attempting to eliminate the errors induced by the presence in the system of reflected signals. In contrast, the present invention utilizes the distinctive presence of relatively low reflected signal power as a basis for processing a position solution.

Some applications, for example indoor cell phone use, are often limited to observing only multipath reflections. The prior types of receivers have not been sensitive to the use of reflected signals to gain additional measurements. The present invention allows the reflected signal to be enhanced and detected such that a useful measurement may be extracted from the reflected signal. Moreover, the current invention allows the optimal selected use of this measurement with respect to non-reflected signals.

BRIEF SUMMARY OF THE INVENTION

The foregoing and other problems experienced in resolving multipath ambiguities for timing devices of the type described herein may be alleviated by the present invention in which the identification of selected characteristics of reflected and direct received signals is used as a basis for improving the accuracy of position determinations in multipath environments. A signal timing device in accordance with the present invention comprises a detector adapted to provide from an input signal a first signal having one selected characteristic and a second signal having another selected characteristic; a plurality of logic circuits to receive the first and second signals separately and operating synchronously to determine a first power level representation for the first signal and a second power level representation for the second signal; a comparator to compare the first and second power level representations; and a timing circuit adapted to provide timing information in accordance with the comparison.

In such a device, which may be a radio positioning receiver, input radio signals that have been reflected may be detected and recognized for processing position solutions. The present invention advantageously enables a position receiver to make accurate ranging measurements in environments where normal signal tracking techniques are inadequate, such as those environments in which the input radio signals may be periodically blocked or have low signal-to-noise ratios, for example, in cities and particularly inside of buildings.

For expediency, the various embodiments of the invention are described herein in the context of navigation receivers designed to operate with signals transmitted by earth-orbiting navigation satellites. It will be recognized by those persons skilled in the relevant art, however, that the invention may be employed in many situations in which the accuracy of timing measurements made from radio signals may be adversely affected by signal reflections prior to reception. For example, specific applications of this invention may include substantially improving positioning solution accuracy for cellular phones conforming to the E911 standard, which would otherwise establish a minimum positioning accuracy to only about 100-meters.

In one embodiment of the present invention, a position receiver detects and provides a received radio signal component having a selected characteristic and processes that signal component to determine its power level. The receiver also detects and provides a received signal component having another selected characteristic and separately processes that signal component to determine its power level. Upon comparison of the power levels, the signal component having the higher power level may be utilized to determine the timing or position solutions.

A particularly suitable signal characteristic is the polarity of the received signal. In the context of GPS, for example, the signals transmitted by the satellites are right-hand circularly polarized ("RHC"). Thus, absent reflections, the satellite signals detected along the line of sight by a position receiver are direct RHC signals. A once-reflected GPS signal is left-hand circularly polarized ("LHC") and will have significantly lower power than a direct signal, typically suffering a 20 to 30 db loss in signal power. For GPS, the position receiver may recognize a reflected or LHC signal on the basis of its relatively lower power. In general it has been found that a received GPS signal having undergone two or more reflections is not likely to be acquired and tracked by a position receiver, although the invention may operate successfully for all odd numbered reflections.

In another aspect, the present invention comprises a positioning receiver having an antenna for detecting circularly polarized signals from which a first extracted power signal having one polarity is generated; a first circuit for extracting from the first extracted power signal a first signal component corresponding to the transmitted signal, and for determining a power level of the first positioning signal component; and a second circuit for comparing the power level with another power level and for determining a use of the first signal component in accordance with the comparison.

A positioning receiver in accordance with the invention may also include a patch antenna from which a second extracted power signal having another polarity is obtained; and a third circuit for extracting from the second extracted power signal a second signal component, and for determining a power level for the second signal component. In such circumstances, the first and third circuits may operate synchronously whereby the power levels to be compared may be based upon respective in-phase and quadrature power levels.

BRIEF DESCRIPTION OF THE DRAWINGS

For a further understanding of the present invention reference may be had to the accompanying drawings, in which:

FIG. 2 is a block diagram of a position receiver according to one embodiment of the invention;

FIG. 3 is a schematic diagram of a patch antenna design according to one embodiment of the invention;

FIG. 4 is a block diagram of a digital signal processor according to one embodiment of the invention;

FIG. 5a is a graphical representation of various in-phase and quadrature correlator outputs of an RHC channel when only a direct RHC signal is being received according to one embodiment of the invention;

FIG. 5b is a graphical representation of various in-phase and quadrature correlator outputs of an LHC channel when only a direct RHC signal is being received according to one embodiment of the invention;

FIG. 6a is a graphical representation of various in-phase and quadrature correlator outputs of an RHC channel when only a reflected LHC signal is being received according to one embodiment of the invention;

FIG. 6b is a graphical representation of the various inphase and quadrature correlator outputs of an LHC channel when only a reflected LHC signal is being received according to one embodiment of the invention;

FIG. 7 is a flowchart of a method according to one embodiment of the invention for detecting and rejecting reflection-only signals; and FIG. 8 is a flowchart of a method according to one embodiment of the invention for using reflected signals.

BRIEF DESCRIPTION OF THE PREFERRED EMBODIMENTS

Figure 1:
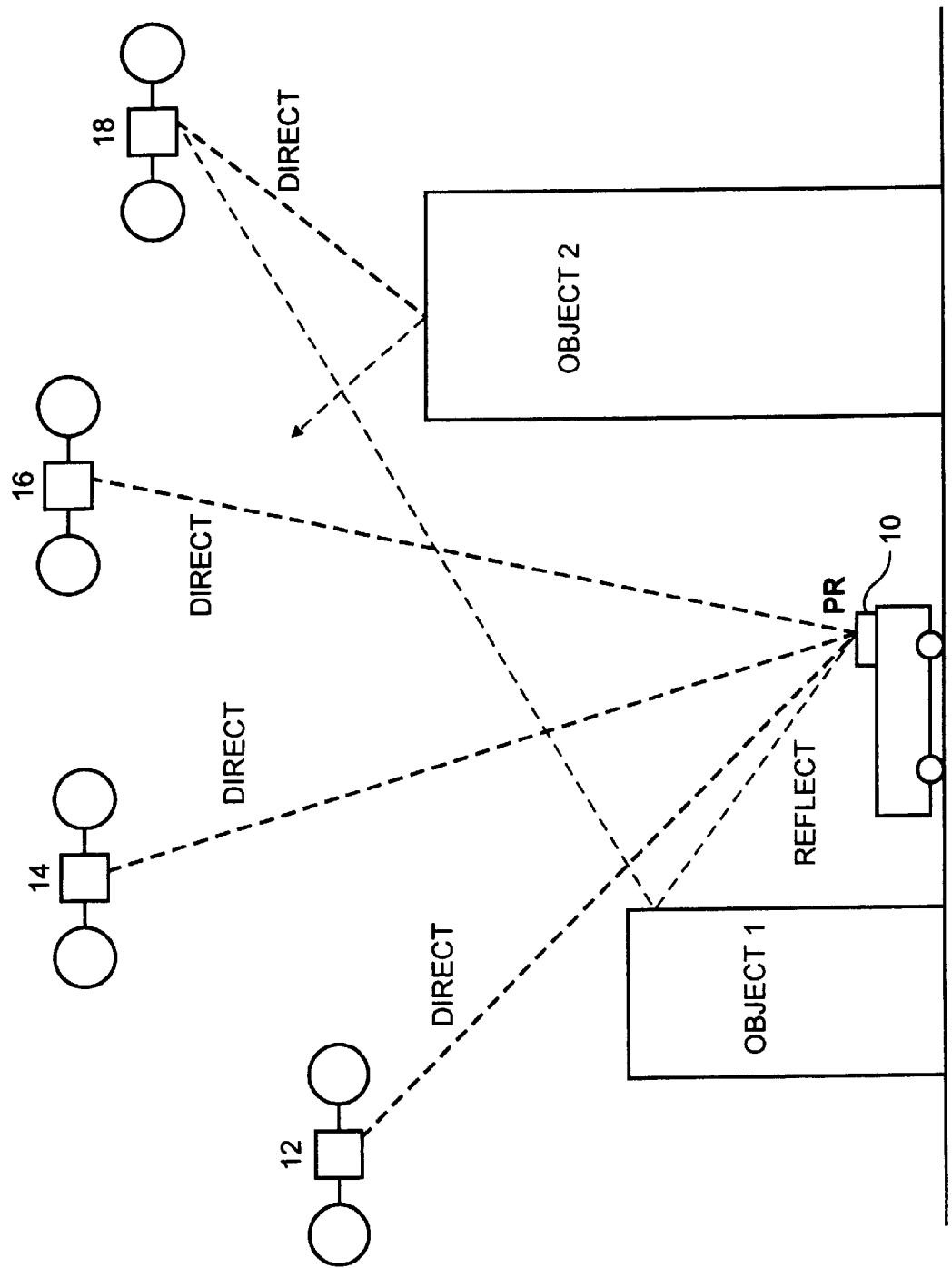
FIG. 1 is a schematic diagram of a positioning system subject to multipath reflections caused by surrounding objects.

Referring now to FIG. 1, there is shown a positioning receiver 10 situated in an environment in which signal reflections may occur and thereby give rise to multipath-induced errors in timing and position solutions. The positioning receiver 10 is mounted on a vehicle and is located between two objects. The objects might be buildings or other potential obstructions. The positioning receiver 10 is shown receiving signals from four signal sources 12, 14, 16 and 18, which in this example comprise a GPS satellite constellation. It will be understood that other signal sources may be used without departing from the scope of the invention. From knowledge of each satellite's position and alignment, as well as of the standard time-of-day information as determined from a GPS navigation message, the positioning receiver 10 can derive the travel time for the signal from each of the four satellites and obtain a position solution for itself. In some applications the position solution may have also been determined by using measurements from other sensors, for example, dead reckoning devices using gyroscopes.

In the example depicted in FIG. 1, the positioning receiver 10 cannot observe the direct signal from the satellite 18 because its signal is blocked by Object 2. Instead, the positioning receiver 10 detects a signal from the satellite 18 that has been reflected from Object 1. Without correction, the reflected signal from satellite 18 will induce a substantial error in the position solution.

With reference to FIG. 2, there is shown a block diagram of a position receiver 30 according to one embodiment of the invention. The receiver 30 includes a right-hand circular/left-hand circular ("RHC/LHC") antenna 32 which, through its phase networks, extracts the maximum received power from both RHC and LHC signals. In the presence of direct signals only, the RHC extracted signal is significantly stronger than the LHC signal and has sufficient signal power to enable the standard positioning receiver functions to be performed accurately. However, when only reflected signals are present, the LHC extracted signals are significantly stronger than the RHC extracted signals. The positioning receiver of the present invention can detect these two conditions, thereby to allow the reflected signals to be effectively identified and removed or used, as desired.

In accordance with the present embodiment of the invention, there is provided a circuit for processing received signals having a selected polarity characteristic, for example RHC. This circuit may comprise a radio frequency/intermediate frequency ("RF/IF") circuit 34, a frequency synthesizer 38, a master oscillator 40, a digital signal processor circuit 42, and a microprocessor 46. This circuit is adapted to perform amplification, frequency translation and sampling on the RHC received signal to produce a right-hand sample signal.

Another circuit for processing received signals having another polarity characteristic, for example LHC, may be provided to perform the foregoing processing functions on an LHC signal so as to produce a left-hand sample signal. Such a circuit may include an RF/IF circuit 36, the frequency synthesizer 38, the master oscillator 40 and a digital signal processor circuit 44 which likewise communicates with the microprocessor 46.

The master oscillator 40 provides a reference oscillator signal. The frequency synthesizer 38 takes the output of the master oscillator 40 and generates the local clock signal 52 and local oscillator frequency signals 54 used elsewhere in the system.

The source signals are received from the satellites by way of the RHC/LHC antenna 32, described in more detail below, which is sensitive to and extracts maximum power from both the RHC and LHC signals. It should be understood that the design of the antenna 32 differs from that of a more conventional positioning receiver antenna, which would not be especially sensitive to, and would normally reject, LHC signals so as to extract very little, if any, power from an LHC signal.

As described in detail below, the foregoing RHC and LHC processing circuits may be synchronized such that a comparison between a power level of the right-hand sample signal and a power level of the left-hand sample signal may yield a determination whether to use one or the other sample signal for further processing. Synchronization may be achieved by setting the state of the second processing circuit to the state of the first processing circuit. As further described below, the power level of the right-hand sample signal can be computed by adding the square of an in-phase punctual correlation accumulation from the first processing circuit with the square of a quadrature punctual correlation accumulation from the first processing circuit; and the power level of the left-hand sample signal can be computed by adding the square of an in-phase punctual correlation accumulation of the second processing circuit with the square of a quadrature punctual correlation accumulation of the second processing circuit.

In the illustrated embodiment, the RHC and LHC signals are extracted from the same antenna element. Such extraction is preferable because other error sources, for example spatial signal power variation, are canceled out. Also, a single antenna element normally results in an advantageously minimum mechanical size.

It will be recognized that two largely separate positioning receivers can be employed for use with this invention, one with an RHC antenna and one with an LHC antenna, without departing from the scope of the invention. It remains a desirable design goal, however, to minimize the number of system components. Furthermore, with respect to the detection and elimination of reflected signals, having two separate positioning receivers may not easily facilitate a master/slave relationship between the RHC and LHC components, described below. Nevertheless, these and other configurations can be employed without departing from the scope of the invention.

With reference to FIG. 3, there is shown an antenna 32 which is designed to operate with one embodiment of the invention. Antenna 32 is preferably of the microstrip or patch type, indicated by reference numeral 64. Such an antenna is designed to receive maximum power from a particular frequency, which is determined by the dimensions of the patch. The patch antenna 64 is provided with two feed points 60, 62. In this embodiment, each feed point has an impedance match at 50Ω and they are positioned on the surface of the patch antenna 64 so as to select signal modes separated by 90°, a technique for detecting circularly polarized signals.

Signals from each of the two feed points 60, 62 are applied to a first phase network 66 in combination. The first phase network is suitable primarily for extracting RHC signal power from the received signal. It outputs this extracted power as a "right hand" signal 70. Similarly, signals from the two feed points 60, 62 are applied to a second phase network 68 in combination. Phase network 68 is suitable for primarily extracting LHC signal power from the received signal and its output appears as a "left hand" signal 72. As will be understood by these skilled in the art, each phase network 66, 68 performs the extraction by delaying the received output of one feed point with respect to the other by one quarter cycle (90°), and then adding together the delayed and undelayed signals. It will be understood that an antenna having one feed point can be used, but two or more feed points are preferable because, as known in the art, such a design produces electrical symmetry which leads to a more stable signal. Other antenna structures known in the art to be capable of performing the foregoing functions may be utilized without departing from the scope of the invention.

As shown in FIG. 2, the extracted signals 70, 72 are further processed in respective separate RF/IF circuits 34, 36. Because the extracted signals 70, 72 have the same frequency, separate RF/IF processing is desirable to avoid mutual interference. The RF/IF circuits 34, 36 perform the operations of amplification, frequency down-conversion, and sampling and each RF/IF circuit processes the respective extracted signal 70, 72 in a similar manner. The downconverted IF output from RF/IF circuit 34 appears on line 48 and the downconverted IF output from RF/IF circuit 36 appears on line 50.

The frequency down-conversion performed by the RF/IF circuits 34, 36 is a known technique for translating particular frequency components around a given center frequency to another, in this case lower frequency, thereby preserving the "shape" of the frequency spectrum as well as any information which may be modulated onto the carrier signal. Frequency translation is advantageous because the signals used by GPS and GLONASS, for example, are generated at the transmitter at a higher frequency to transmit within allocated signal bandwidth and with desirable propagation characteristics, and are easier to process at the positioning receiver at a frequency lower than that used for transmission. As known in the art, down-conversion may be performed in the RF/IF circuits 34, 36 using a mixer which multiplies the respective extracted signals by an appropriate receiver-generated signal. The IF signals 48, 50 are input respectively to corresponding digital signal processor circuits 42, 44.

Referring now to FIG. 4, there is shown a digital signal processor subsystem ("DSP") of one of the digital signal processor circuits 42, 44 according to an embodiment of the invention. Each digital signal processor circuit 42, 44 contains one or more DSPs. Each DSP 78 includes a code correlator circuit generally indicated by reference numeral 80. The code correlator circuit 80 includes a code mixer 88 and an accumulator 89, the operation of which is further described below.

A carrier mixer 90 receives the IF digital samples 48 and 50 from respective RF/IF circuits 34 and 36 for translation nearly to baseband. A carrier oscillator 84 provides in-phase and quadrature signals to the carrier mixer over lines 92, 94. The output of the carrier mixer 90 includes in-phase and quadrature signal sets ("I, Q")that are processed by the code mixer 88. Code mixer 88 combines the I, Q signal sets from the carrier mixer with a locally generated replica of the incoming spreading code supplied by a code generator 86. The output of the code mixer 88 includes early, punctual and late signals for each of the in-phase and quadrature code sets. These signals are, in effect, time-distributed representations of the autocorrelation function between the satellite and the locally generated codes. A set of correlator accumulators integrate these signals over a period controlled by the code epoch, supplied by the code generator 86 over line 98. The resulting correlation values are read out by the microprocessor over line 100.

The microprocessor 46 reads the correlator outputs 100, usually at an integer multiple of a C/A epoch, and computes code and carrier error signals, indicated respectively at lines 97 and 99. The code and carrier error signals 97, 99 are then applied by the microprocessor 46 to the code oscillator 82 and carrier oscillator 84, respectively, to close the code and carrier loops. It will be understood that closing a loop refers to the operation well known in the art in which a feedback loop is used to continuously modify a local signal to reduce an error signal derived from a difference between the input signal and the local signal. In this way the locally-generated spreading code is kept substantially aligned with the incoming satellite spreading code. In some receivers, a feedback correction term is also supplied over line 97, for example, to the carrier oscillator 84 such that the locally generated carrier signal output from the carrier oscillator 84 is kept substantially aligned with the incoming satellite carrier phase.

More specifically, the early and late, in-phase and quadrature, correlation signals $I_E$, $I_L$, $Q_E$, $Q_L$ are used to compute a code loop error, and the punctual in-phase and quadrature correlation signals $I_P$, $Q_P$ are used to compute a carrier loop error. When both loops are locked, the majority of signal power appears in the in-phase correlation results $I_E$, $I_P$, $I_L$, with the quadrature correlation results $Q_E$, $Q_P$, $Q_L$, being minimized as part of the carrier loop. Thus, in the code loop, the code generator 86 generates a punctual code signal which is time shifted to produce the maximum accumulated correlation result, that is, the peak of the correlation function. While this invention is described with reference to a receiver which locally generates a carrier signal, other types of receivers can also operate with this invention, including those in which the carrier of the received signal is primarily removed by sampling, followed by a subsequent rotation of the sampled signal.

A plurality of pairs of DSPs has been found to be preferable for most embodiments of the present invention. In such embodiments, each DSP tracks one of the multiple source signals being received simultaneously by the antenna. Thus, if N satellite signals are to be tracked, then each digital signal processing circuit 42, 44 will contain N DSPs. In other words, the more DSPs provided, the more satellite signals that can be tracked simultaneously. Similar to conventional positioning receivers, each DSP in digital signal processor circuit 42 tracks a respective satellite signal by way of the sampled signal 48 which was extracted from the received RHC signals.

Unlike conventional receivers, however, one embodiment of this invention provides a digital signal processor circuit 44 for processing sampled signal 50 which was extracted from the received LHC signals. Each DSP 78 subsumed within the digital signal processor circuit 44 may be referred to as an "LHC channel," and is synchronized or slaved to a corresponding DSP, referred to herein as an "RHC channel", within the digital signal processor circuit 42. Each RHC channel is tracking the same satellite using the corresponding received RHC signals.

In the present embodiment the digital signal processors are synchronously clocked state devices whose state is known at any time from a set of given input histories. In this invention, the slaving process may include maintaining the carrier oscillator 84, the code generator 86, and the code oscillator 82 circuits of an LHC channel in the same state as the corresponding components of an RHC channel. Thus, every time the state is changed by the microprocessor 46 in the equivalent RHC channel, the same state is applied to the corresponding LHC channel. For example, in one embodiment of this invention, the minimum RHC channel state information passed to the LHC channel is: (1) carrier error signal 97, and (2) code error signal 99. In this embodiment, because the code oscillator 82 clocks the code generator 86, the code error signal 99 can maintain, that is, synchronize, both the code oscillator and the code generator.

Because the sampled signals 48, 50 are different from each other and because the code oscillator 82, carrier oscillator 84, and code generator 86 states are set to be identical, the outputs from the correlator circuit 80 of an RHC channel will differ from those same outputs from the same components of a corresponding LHC channel. In other words, an LHC channel does not close any of its own loops. The LHC channel maintains the state of the RHC channel loops but operates on the LHC sampled signal 50 instead of the RHC sampled signal 48. The LHC channel thus provides a measure of the power available to the RHC channel from the LHC signal being received. As a result, a direct comparison is provided of the relative power of the RHC signal with respect to the LHC signal being received at the same instant in time. Also the LHC channel correlator circuit can be read by the microprocessor 46 to perform reflection signal rejection.

Referring now to FIGS. 5a and 5b, there is shown a correlation function derived from the accumulated correlation results for the RHC signals and LHC signals, respectively, when only a direct signal, therefore an RHC signal, is being received. Because the quadrature accumulated correlation results are driven to zero by the carrier tracking loop in the RHC channel, the in-phase accumulated correlation results from the RHC channel are relatively significant as shown in FIG. 5a. However, in the corresponding LHC channel the in-phase accumulated correlation results are shown in FIG. 5b to be substantially lower. This effect is seen to occur because in the presence of a direct RHC signal a strong LHC signal is not present at the antenna.

With reference to FIGS. 6a and 6b, there is shown a correlation function derived from the accumulated correlation results for the RHC and LHC signals, respectively, when only a reflected signal, and therefore an LHC signal, is being received. In this case, the sum of the in-phase correlated input samples in the LHC channel is seen from FIG. 6b to be substantially greater than that from the RHC channel, as shown in FIG. 6a. It will be understood that the foregoing examples are deduced from the GPS context and that the present invention is not to be so limited.

Referring now to FIG. 7, there is shown a flowchart of a method, according to one embodiment of the invention, for detecting and rejecting reflection-only signals. Step 110 consists of acquiring a source signal using an RHC channel in a digital signal processor circuit 42 (FIG. 2). This step is performed conventionally. In Step 120 an RHC channel state defined by at least the states of the code oscillator 82, carrier oscillator 84, and code generator 86, is applied to a corresponding LHC channel in digital signal processor circuit 44 (FIG. 2). The sums of the accumulated correlated samples are then read from both of the RHC channel and the corresponding LHC channel, as set forth in step 130. In Step 140 the code and carrier tracking loops of the RHC channel are closed conventionally. Meanwhile, as indicated by Step 150, the state of the LHC channel is synchronized with or slaved to that of the corresponding RHC channel. In Step 160 the punctual power appearing in the RHC channel (represented by $K_1$) is calculated from the sums of the accumulated in-phase and quadrature correlated punctual samples in that channel. The punctual power appearing in the LHC channel (represented by $K_2$) is similarly calculated for that channel. The calculations are performed as follows:

$K_1$=(accumulated punctual in-phase result)$^2$ +(accumulated punctual quadrature result)$^2$ (from RHC channel)

$K_2$=(accumulated punctual in-phase result)$^2$ +(accumulated punctual quadrature result)$^2$ (from LHC channel)

The correlated results from both the in-phase and quadrature signals are used to compute the punctual power appearing in a given channel because although the RHC and LHC channels in the digital signal processors 42, 44 are synchronized, in practice a small phase delay offset may occur as the RHC and LHC signals traverse the circuitry of the RF/IF circuit 34 and the RF/IF circuit 36, respectively. Thus, maximizing the sums of the in-phase correlated samples contained in the RHC channel does not alone guarantee that a similar result will be obtained from the LHC channel.

Upon determining the accumulated punctual power $K_1$ appearing in the RHC channel and the accumulated punctual power $K_2$ appearing in the corresponding LHC channel, $K_1$ and $K_2$ are compared in suitable circuitry, as represented at Step 170 of FIG. 7. If $K_1$ is determined to be larger than $K_2$ then the signal being tracked in the RHC channel is seen to be dominated by a direct signal and the code and carrier phase measurements from the RHC channel can be used for the position solution, as reflected in Step 190 of FIG. 7. On the other hand, if $K_1$ is not larger than $K_2$, then the signal being tracked in the RHC channel is seen to be an RHC component of a dominant LHC signal. Where an LHC signal is dominant, it maybe assumed that the signal being tracked is not a direct signal but is a reflected signal. Accordingly, the code and carrier phase measurements from the RHC channel should not be used in determining position, as indicated at Step 180 of FIG. 7, since these measurements would not yield an accurate position.

It will be understood that while the invention has been described in connection with an embodiment in which the punctual correlators have been used in the channel circuits for determining $K_1$ and $K_2$, early and/or late sets of correlators may also be used to determine $K_1$ and $K_2$ without departing from the scope of the invention. Punctual correlators have been found to be advantageous, however, as they may reflect higher signal powers and to that extent their outputs tend to yield more accurate measurements and ultimately, more accurate position determinations.

Referring now to FIG. 8, there is depicted a flowchart showing the use of reflected signals, according to the invention, for obtaining the measurements to be used in making position determinations. In some circumstances, the positioning receiver may not be able to track a signal source through an RHC channel. This may occur, by way of example only, when the signal-to-noise ratio of the received signal is unusually low because the receiver is inside of a building. In this event, it has been found that the LHC channel may provide a useful measurement and allow the positioning receiver to complete a position or standard time-of-day solution. The LHC channel is very sensitive to the reflected signal, compared to the RHC channel. Hence, use of the LHC channel allows the multipath signal derived pseudo range measurement to be used in a position fix calculation where otherwise no measurement would be available.

The flow chart of FIG. 8 illustrates one technique for determining the appropriate polarization channel from which to obtain measurements for use in position calculations. As indicated in Steps 210 and 220, the first decision is to determine whether the position receiver is able to lock onto an RHC received signal or an LHC signal. Upon acquisition of a source signal, indicated in FIG. 8 to eminate from a satellite as an example, the system determines whether the signal being tracked is an RHC or LHC signal. These decisions are made by determining whether the RHC channel and LHC channels are locked, as indicated respectively at steps 230 and 240. Priority is awarded to the RHC channel. If the RHC channel is locked, the RHC channel is used for the positioning receiver's solutions because the signal being processed there is more likely to be a direct signal. However, if the RHC channel is not locked, then the system determines whether the LHC channel is locked. If so, its measurements are used for the positioning receiver's solution. If neither the RHC or LHC is locked, no position solution is performed using this particular satellite.

In another embodiment of the invention, the RHC and LHC channel states may not be slaved together. The code and carrier loops of the LHC channel, may be independently closed, even for reflection rejection, if it is determined that the accumulated punctual correlation result is sufficiently high. In this way, a useful measurement of signal power from the particular source may be derived.

In another embodiment, the LHC channel outputs may be combined with the RHC channel outputs to boost the total signal. In such an embodiment, if the relationship between the direct and reflected signal can be determined (for example, the user inputs the relationship, such as, the reflected signal is known to have a travel time of x microseconds or milliseconds longer than the direct signal because the reflecting surface is independently measured or otherwise determined as being a certain distance from the receiver) then the accumulated correlation results from the RHC channel can be added to the accumulated correlation results from LHC channel after those results have been adjusted for the additional travel time.

Although the invention has been described in connection with specific embodiments, variations may be introduced by those persons skilled in the relevant art without departing from the spirit of the disclosure or from the scope of the appended claims. The foregoing embodiments are set forth for the purpose of illustration only and should not be read as limiting the invention or its application. The following claims should be interpreted to be commensurate with the spirit and scope of the invention.

What is claimed is:

1. A method comprising the steps of:

receiving a satellite navigation signal that can be RHC polarized or LHC polarized;

determining if it is RHC polarized and if so deriving timing information from it; and determining if it is LHC polarized and if so selectively deriving timing information from it or rejecting it.

* * * * *